United States Patent
Ito et al.

(10) Patent No.: US 9,430,089 B2
(45) Date of Patent: Aug. 30, 2016

(54) INFORMATION PROCESSING APPARATUS AND METHOD FOR CONTROLLING THE SAME

(71) Applicant: CANON KABUSHIKI KAISHA, Tokyo (JP)

(72) Inventors: Hikaru Ito, Tokyo (JP); Seiko Kono, Kawasaki (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 14/141,338

(22) Filed: Dec. 26, 2013

(65) Prior Publication Data
US 2014/0184572 A1 Jul. 3, 2014

(30) Foreign Application Priority Data

Dec. 28, 2012 (JP) ................. 2012-287245

(51) Int. Cl.
*G06F 3/041* (2006.01)
(52) U.S. Cl.
CPC ... *G06F 3/0418* (2013.01); *G06F 2203/04104* (2013.01); *G06F 2203/04808* (2013.01)
(58) Field of Classification Search
CPC ............ G06F 2203/04104; G06F 2203/04108
See application file for complete search history.

(56) References Cited

U.S. PATENT DOCUMENTS

| 2012/0023459 A1* | 1/2012 | Westerman | G06F 3/03547 715/863 |
| 2013/0227413 A1* | 8/2013 | Thorsander | G06F 3/0482 715/716 |

FOREIGN PATENT DOCUMENTS

JP 2009-217814 A 9/2009

* cited by examiner

*Primary Examiner* — Carolyn R Edwards
(74) *Attorney, Agent, or Firm* — Canon USA, Inc. IP Division

(57) ABSTRACT

The present invention provides an information processing apparatus configured to recognize a touch operation. The information processing apparatus includes an obtaining unit configured to obtain a plurality of touch positions touched on a display screen; a specifying unit configured to specify an object displayed at a position corresponding to each of the touch positions obtained by the obtaining unit on the display screen when at least one of the touch positions obtained by the obtaining unit is included in a predetermined range on the display screen; and a determination unit configured to determine, among the touch positions obtained by the obtaining unit, a touch position included in the predetermined range as an invalid input for a touch operation to the information processing apparatus when the object specified by the specifying unit is not a plurality of objects associated with each other.

19 Claims, 14 Drawing Sheets

FIG. 5A
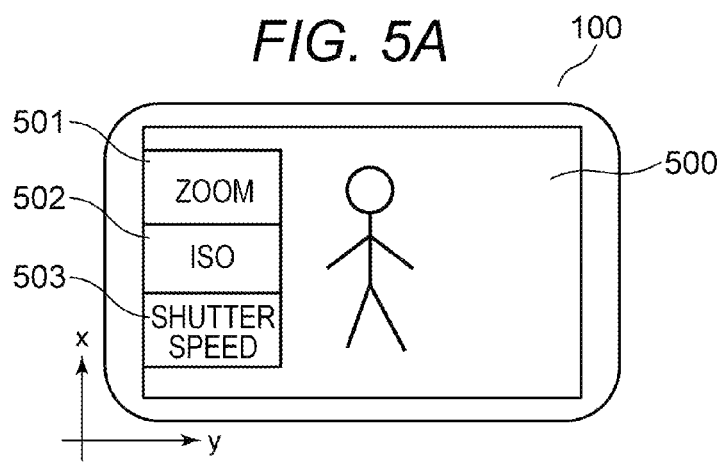
FIG. 5B
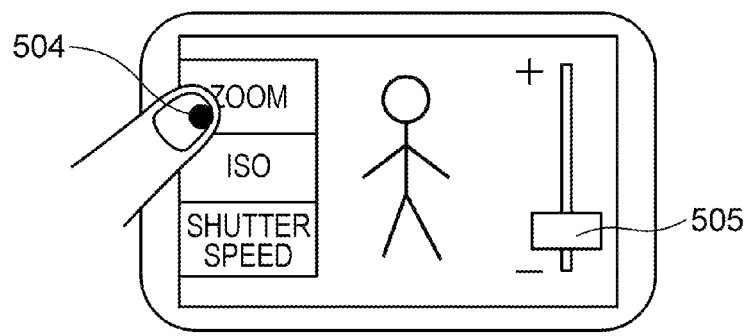
FIG. 5C
| OBJECT NAME | OBJECT ID | ASSOCIATION INFORMATION |
|---|---|---|
| ZOOM | 1 | 1-1 |
| ISO | 2 | 2-1 |
| SHUTTER SPEED | 3 | 3-1 |
| ZOOM ADJUSTMENT BAR | 1-1 | 1 |
| ISO ADJUSTMENT BAR | 2-1 | 2 |
| SHUTTER SPEED ADJUSTMENT BAR | 3-1 | 3 |
| CAPTURED IMAGE | 4 | |

FIG. 8A

| ID | X[dot] | Y[dot] | Time[ms] | DISPLAYED OBJECT ID |
|---|---|---|---|---|
| 1 | 380 | 10 | 0 | 1 |

FIG. 8B

| ID | X[dot] | Y[dot] | Time[ms] | DISPLAYED OBJECT ID | FLAG ON POSSIBLY INVALID TOUCH POINT |
|---|---|---|---|---|---|
| 1 | 380 | 10 | 0 | 1 | TRUE |
| 2 | 80 | 620 | 1000 | 1-1 | TRUE |

FIG. 8C

| ID | X[dot] | Y[dot] | Time[ms] | DISPLAYED OBJECT ID | FLAG ON POSSIBLY INVALID TOUCH POINT |
|---|---|---|---|---|---|
| 1 | 380 | 10 | 0 | 1 | FALSE |
| 2 | 330 | 620 | 2000 | 1-1 | FALSE |

FIG. 8D

| ID | X[dot] | Y[dot] | Time[ms] | DISPLAYED OBJECT ID |
|---|---|---|---|---|
| 1 | 220 | 10 | 0 | 4 |

FIG. 8E

| ID | X[dot] | Y[dot] | Time[ms] | DISPLAYED OBJECT ID | FLAG ON POSSIBLY INVALID TOUCH POINT |
|---|---|---|---|---|---|
| 1 | 220 | 10 | 0 | 4 | TRUE |
| 2 | 200 | 600 | 1000 | 4 | FALSE |

FIG. 12A
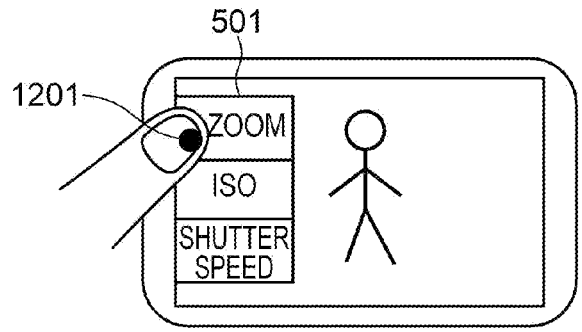
FIG. 12B
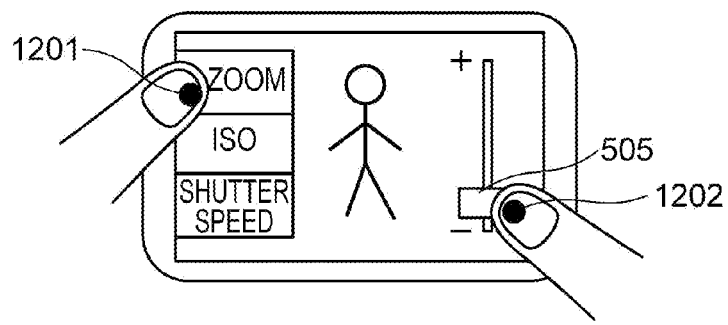
FIG. 12C
| ID | X[dot] | Y[dot] | Time[ms] | DISPLAYED OBJECT ID | FLAG ON LATEST TOUCH POINT |
|---|---|---|---|---|---|
| 1 | 380 | 10 | 0 | 1 | TRUE |
FIG. 12D
| ID | X[dot] | Y[dot] | Time[ms] | DISPLAYED OBJECT ID | FLAG ON LATEST TOUCH POINT | FLAG ON POSSIBLY INVALID TOUCH POINT |
|---|---|---|---|---|---|---|
| 1 | 380 | 10 | 0 | 1 | FALSE | TRUE |
| 2 | 80 | 620 | 1000 | 2 | TRUE | FALSE |
FIG. 12E
| ID | X[dot] | Y[dot] | Time[ms] | DISPLAYED OBJECT ID | FLAG ON LATEST TOUCH POINT | FLAG ON POSSIBLY INVALID TOUCH POINT |
|---|---|---|---|---|---|---|
| 1 | 380 | 10 | 0 | 1 | FALSE | FALSE |
| 2 | 330 | 620 | 2000 | 2 | TRUE | FALSE |

FIG. 14A

| OBJECT NAME | OBJECT ID | ASSOCIATION INFORMATION |
|---|---|---|
| DISPLAY REGION | 1 | |
| SCROLL BAR | 2 | |

FIG. 14B

| ID | X[dot] | Y[dot] | Time[ms] | DISPLAYED OBJECT ID | FLAG ON LATEST TOUCH POINT |
|---|---|---|---|---|---|
| 1 | 10 | 320 | 0 | 1 | TRUE |

FIG. 14C

| ID | X[dot] | Y[dot] | Time[ms] | DISPLAYED OBJECT ID | FLAG ON LATEST TOUCH POINT | FLAG ON POSSIBLY INVALID TOUCH POINT |
|---|---|---|---|---|---|---|
| 1 | 10 | 320 | 0 | 1 | FALSE | TRUE |
| 2 | 470 | 100 | 1000 | 2 | TRUE | FALSE |

FIG. 14D

| ID | X[dot] | Y[dot] | Time[ms] | DISPLAYED OBJECT ID | FLAG ON LATEST TOUCH POINT | FLAG ON POSSIBLY INVALID TOUCH POINT |
|---|---|---|---|---|---|---|
| 1 | 10 | 320 | 0 | 1 | FALSE | TRUE |
| 2 | 470 | 600 | 2000 | 2 | TRUE | FALSE |

INFORMATION PROCESSING APPARATUS AND METHOD FOR CONTROLLING THE SAME

BACKGROUND OF THE INVENTION

1. Field of the Invention

The present invention relates to a technique for recognizing a touch operation.

2. Description of the Related Art

A touch input device has spread in these years. The touch input device imports the X and Y coordinate values of a touched position as input values in response to a touch on the screen by the user's finger or a stylus so as to perform various processes based on the input values. A technique for a so-called multi-touch in which the user operates the device by touching a plurality of points on the screen has been developing. The user can perform various operations such as enlargement, reduction, and scroll, for example, by touching two points with the user's right hand index figure and thumb in the multi-touch operation.

Designing as much of the whole device as possible on the screen is often required for such touch input devices. However, the user may happen to unconsciously touch the screen, for example, in order to hold the touch input device with the use's hand. When, as described above, the user mistakenly touches the screen on the touch input device in which a multi-touch operation can be performed, more touch inputs are recognized than the user intended. This can cause malfunction.

Japanese Patent Application Laid-Open No. 2009-217814 discloses that a touch on the peripheral edge of the touch panel is selectively ignored. In that case, when a touch on the edge moves a distance exceeding a predetermined distance or moves at a speed exceeding a predetermined speed, or when a touch started in the central region of the touch panel enters the edge, the touch on the edge is recognized as a part of a gesture.

However, various displays including a user interface are displayed even on the edge of a touch panel in many touch input devices in order to efficiently use the display region of the touch panel. A method disclosed in Japanese Patent Application Laid-Open No. 2009-217814 in which all touch points without moving are determined as invalid on the edge limits the contents allowed to be displayed on the edge.

SUMMARY OF THE INVENTION

An objective of the present invention is to improve the operability of the user interface displayed in a predetermined range when a touch point in the predetermined range on the touch panel display is selectively determined as an invalid input.

The present invention provides an information processing apparatus configured to recognize a touch operation. The information processing apparatus includes an obtaining unit configured to obtain a plurality of touch positions touched on a display screen; a specifying unit configured to specify an object displayed at a position corresponding to each of the touch positions obtained by the obtaining unit on the display screen when at least one of the touch positions obtained by the obtaining unit is included in a predetermined range on the display screen; and a determination unit configured to determine, among the touch positions obtained by the obtaining unit, a touch position included in the predetermined range as an invalid input for a touch operation to the information processing apparatus when the object specified by the specifying unit is not a plurality of objects associated with each other. Further features of the present invention will become apparent from the following description of exemplary embodiments (with reference to the attached drawings).

BRIEF DESCRIPTION OF THE DRAWINGS

FIGS. 5A to 5C are diagrams of an exemplary display state of an object and exemplary association information;

FIGS. 8A to 8E are diagrams of exemplary stored information about touch points;

FIGS. 12A to 12E are diagrams of an exemplary operation on the information processing apparatus;

FIGS. 14A to 14D are diagrams of exemplary stored information about touch points.

DESCRIPTION OF THE EMBODIMENTS

Hereinafter, exemplary embodiments of the present invention will be described with reference to the accompanying drawings. Note that the exemplary embodiments to be described below are examples in which the present invention is specifically implemented and the present invention is not limited to the exemplary embodiments.

(First Embodiment)

Figure 1A:
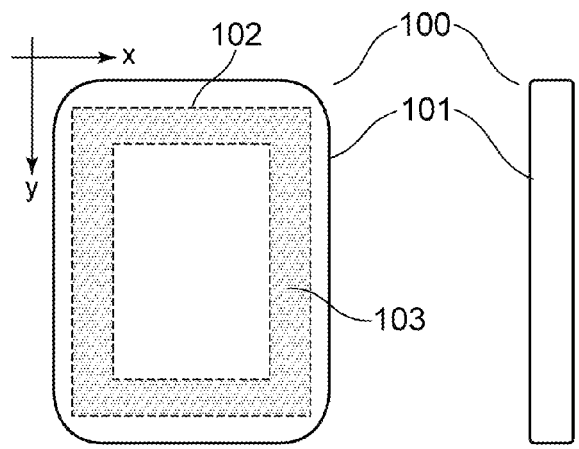
FIGS. 1A to 1C are diagrams of an exemplary appearance and configuration of an information processing apparatus.
Figure 1B:
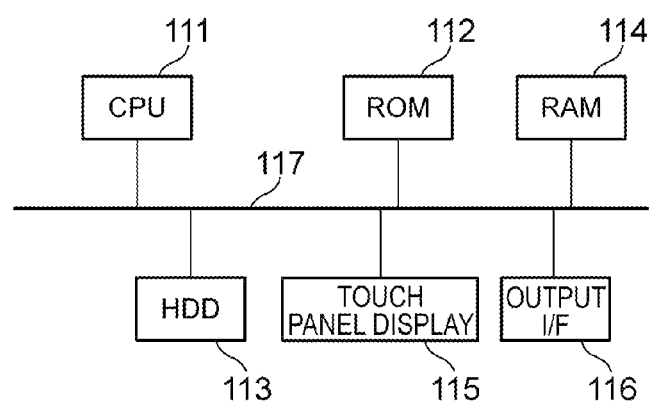
Figure 1C:
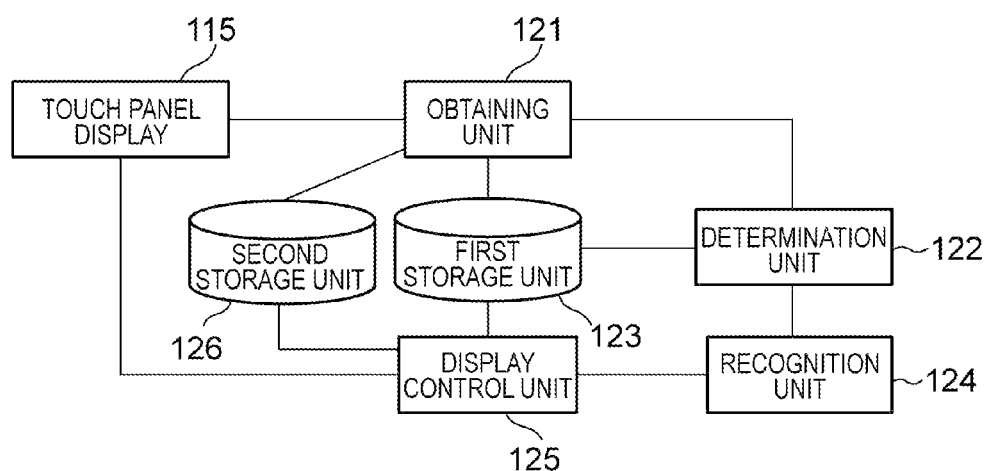

FIGS. 1A to 1C are diagrams of an exemplary appearance and hardware configuration of an information processing apparatus applicable to the present exemplary embodiment. FIG. 1A is a diagram of a mobile terminal that is an example of an information processing apparatus 100 when viewed from the front side and the lateral side of the screen. A housing 101 is an outer periphery of an input region 102 and made of, for example, synthetic resin or metal in FIG. 1A. The input region 102 includes, for example, a touch sensor and is a target region to be touched by the user so as to receive an input to the information processing apparatus 100. The input region 102 includes a touch panel display in which a touch sensor is installed on a display that is a display portion in the present exemplary embodiment. A display screen of the touch panel display is an interface configured to display an image for operating the information processing apparatus 100 or a device connected to the information processing apparatus 100. When carrying the information processing apparatus 100, the user usually grasps a part of the housing 101 with the user's hand. At that time, the user happens to touch a portion near an outer edge of the input region 102 with the user's finger. In the present exemplary embodiment, a range 103 from the outer edge of the inside of the input region 102 to a predetermined distance inwardly away from the outer edge is set as a predetermined range where it is expected that the user happens to mistakenly touch the range. Note that the input region 102 on a touch panel display 115 in the information processing apparatus 100 described herein has a resolution of 480 [dot]×640 [dot] and can manage the positional information as a plane of coordinates that has the origin on the upper left of the drawing.

Hereinafter, the mobile terminal illustrated in FIG. 1A will be described as the information processing apparatus 100 in the present exemplary embodiment.

Hereinafter, the position touched by the user in the input region 102 is specified as a point and is referred to as a touch point in the present exemplary embodiment. The positional information of the touch point is handled as the information of the coordinates on the assumption that the input region 102 is a plane of coordinates having the origin on the upper left of the drawing. However, the position touched by the user can be obtained in a method except the method in which the point is specified. For example, both of the information corresponding to the area touched by a finger and the information indicating the point that is the median point (or the center) of the touched region can be obtained.

It is considered in the present exemplary embodiment that it is highly possible that the touch point obtained in the predetermined range 103 set on the outer edge of the input region 102 among one or more touch points touched by the user in the input region 102 has been touched because the user carries the apparatus with the user's hand. However, when the obtained touch points contact one or more associated objects, it is deemed that the user has touched the input region 102 in order to operate the object even if the touch points have been obtained in the predetermined range 103. Thus, among the touch points obtained in the predetermined range 103, the touch point that does not contact an object associated with the object that the other touch point contacts is determined as an invalid input.

FIG. 1B is an exemplary block diagram of a hardware configuration of the information processing apparatus 100 applicable to the present exemplary embodiment. In FIG. 1B, a CPU 111 is a central processing unit, ROM 112 is read only memory, and an HDD 113 is a hard disk drive. The CPU 111 reads and executes a control program stored in the ROM 112 or the HDD 113 so as to control each device in the present exemplary embodiment. The control program is for causing the information processing apparatus 100 to perform the operations to be described in the present exemplary embodiment. The ROM 112 stores such control programs and various types of data used by the programs. RAM 114 is random access memory and includes, for example, the work region of the program of the CPU 111, a data save region at an error handling, and a load region for the control programs. The HDD 113 stores the control programs and various types of data. The touch panel display 115 is a device that combines a touch sensor or the like for importing the information about the user operation in the input region 102 and a display screen for outputting a display. The touch panel display 115 integrated in the information processing apparatus 100 is used as the touch panel working as an input device and the display device working as an output device in the present exemplary embodiment. However, an external device connected to the information processing apparatus 100 can also be used. A capacitance type touch panel display is used as the touch panel display 115 working as an input device in the present exemplary embodiment. The touch panel display 115 can operate in two modes, a normal mode and a sensitive mode in the present exemplary embodiment. In the normal mode, every time after the touch sensor provided on an operation panel and configured to detect a touch by the user scans the surface of the touch panel display and detects a point touched by the user or a point from which a touch has been released one by one, the points are sequentially notified as touch events to the information processing apparatus 100. On the other hand, in the sensitive mode, the sensitivity of the touch sensor increases. Thus, the finger close to the surface of the touch panel display 115 is detected as a touch point even though the finger has not touched the surface. However, the touch panel is not limited to the capacitance type. A touch panel configured to detect a touch or a vicinity of the user to the operation surface, for example, using an electromagnetic induction or optical sensor device can be used. An output I/F 116 is for outputting various types of information through a network or the like to an output device except for the display. A bus 117 transfers an address signal indicating a component to be controlled by the CPU 111, a control signal for controlling each component, and data transferred among the component devices. Note that the control program can previously be stored in the ROM 112 or the HDD 113, or can be received from an external device through the network and stored in the ROM 112 or the HDD 113 as necessary.

The CPU 111 performs each of the functions of the information processing apparatus 100 to be described below or each of the operations described in the flowcharts to be described below by executing the program stored in, the ROM 112, the HDD 113, or the like.

FIG. 1C is an exemplary block diagram of the software configuration of the information processing apparatus 100.

An obtaining unit 121 includes the CPU, the ROM, and the RAM (hereinafter, referred to as the CPU and the like) so as to obtain the information about a touch point touched by the user based on a signal notified from the touch sensor on the touch panel display 115. The information about a touch point includes, for example, the coordinate information indicating the position of the touch point in the input region 102, and the information indicating the obtaining time when the touch point has been obtained at the position, the order in which the touched position has been obtained, and the like. The obtaining unit 121 stores the obtained information in a first storage unit 123 included in the RAM 114.

A determination unit 122 includes the CPU and the like so as to determine whether each touch point is a valid input or an invalid input to the information processing apparatus 100 when it has been determined that there is a plurality of touch points obtained by the obtaining unit 121 based on the information stored in the first storage unit 123. The predetermined range 103 is set in the input region 102 in the present exemplary embodiment. The predetermined range 103 corresponds to the part where the user happens to touch when the user holds the information processing apparatus 100, for example, a range from the outer edge of the input region to a predetermined distance away from the outer edge. The determination unit 122 determines a touch point as a possible invalid input when the position of the touch point is included in the set predetermined range 103. The determination unit 122 determines the touch point as a valid input when an object associated with the object displayed on the other touch point is displayed at the position of each of the touch points that have been determined as possibly invalid inputs. The determination unit 122 determines the touch point as an invalid input when the object associated with the object displayed on the other touch point is not displayed at the position of each of the touch points that have been determined as possibly invalid inputs. The information about the object or the content data included in the displayed image displayed on the touch panel display 115 and used for the determination process in the determination unit 122 is stored in a second storage unit 126 in the present exemplary embodiment.

A recognition unit 124 includes the CPU and the like to receive the determination result from the determination unit 122 and obtain the information about a valid touch point from the information stored in the first storage unit 123 so as to recognize the information as the input information included in the touch operation.

A display control unit 125 is configured to generate a displayed image reflecting the result according to the input based on the information stored in the second storage unit 126 in order to control the display to output the image to the touch panel display 115 working as the display unit. For example, when the object shows the user interface designated by the touch point determined as valid, the display control unit 125 generates a displayed image reflecting the operation according to the object and outputs the image.

The second storage unit 126 stores image data necessary for the display control unit 125 to generate a displayed image, and the attribute information. The second storage unit 126 stores, for example, the image information and the information indicating the display position about a plurality of objects that are the components of the graphical user interfaces of various applications performed in the information processing apparatus 100 or the operation system. Further, the second storage unit 126 sometimes stores the object that forms a graphical user interface screen with associating the object to the other object. For example, when there is a user interface that operates a function by cooperating a plurality of objects, the association information associating the objects to each other is added to the objects as it is determined that the objects are associated with each other. The determination unit 122 determines based on the association information added to the object displayed at the position of each of the touch points whether the object displayed at the touch point included in the predetermined range 103 is associated with the object displayed at the other touch point. When determining that the object displayed at the touch point included in the predetermined range 103 is associated with the object displayed at the other touch point, the determination unit 122 determines the touch point included in the predetermined range 103 as valid. When determining that the object displayed at the touch point included in the predetermined range 103 is not associated with the object displayed at the other touch point, the determination unit 122 determines the touch point included in the predetermined range 103 as invalid. Note that the RAM 114 reads the information stored in the HDD 113, an external storage device, or the ROM 112. This forms the second storage unit 126. Note that the association information indicates only the link between an object and another object in the present exemplary embodiment. When the same object is displayed at a plurality of touch points, it is determined that an object that is not associated with another is touched.

The CPU 111 develops the program stored in the ROM 112 to the RAM 114 to execute the program in order to implement each function of the functional units in the present exemplary embodiment. Note that an information processing apparatus that implements the functional units with hardware can similarly implement the present invention.

Figure 2:
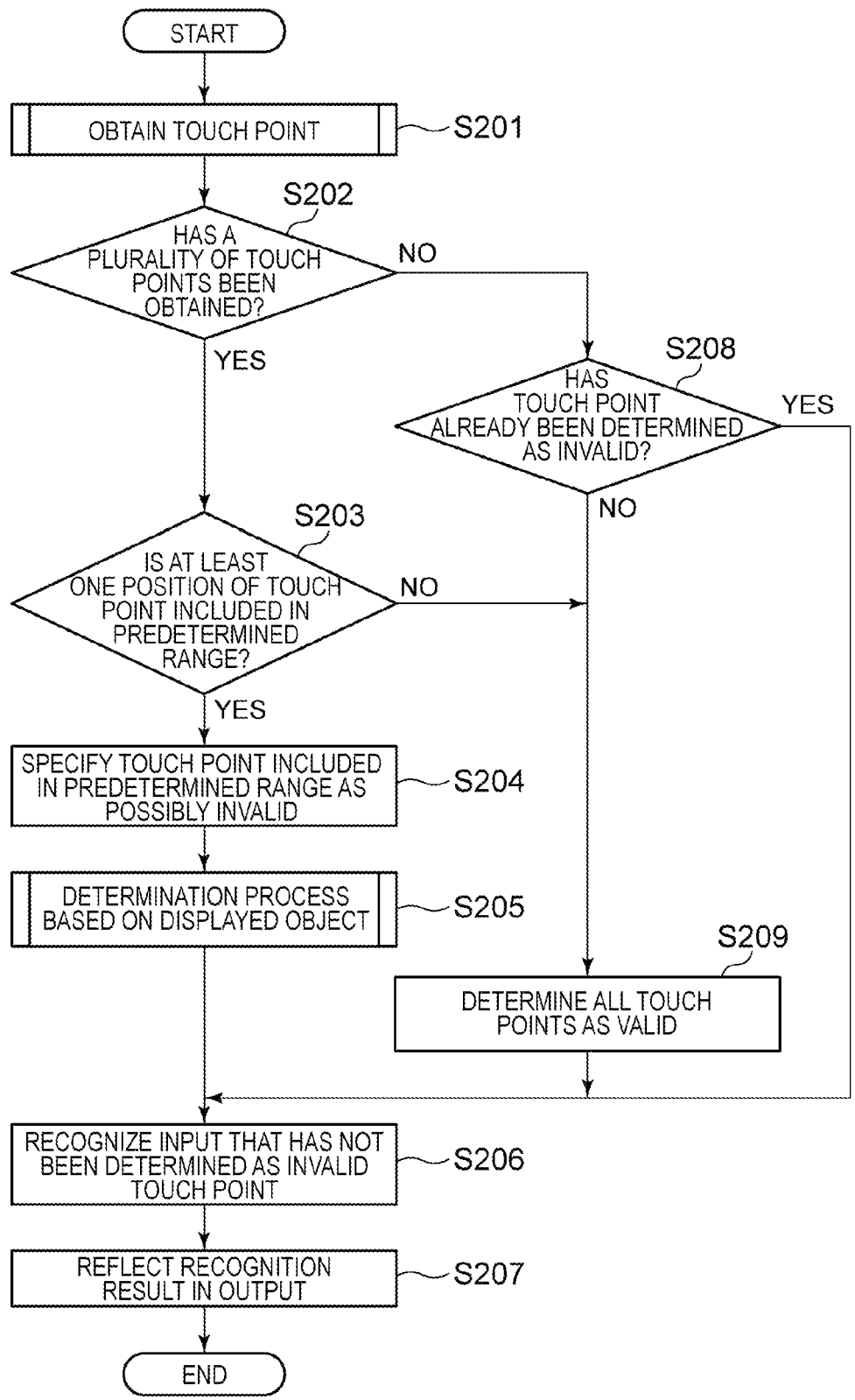
FIG. 2 is a flowchart for describing an exemplary flow of a process for recognizing a touch input by the user.

Next, the flow of a process for recognizing a touch input by the user in the present exemplary embodiment will be described according to the flowchart in FIG. 2. Note that turning on the information processing apparatus 100 starts the following process in the present exemplary embodiment. However, the present invention is not limited to the present exemplary embodiment. Releasing the lock on the apparatus, starting a specific application, or completing drawing a displayed image can also start the process for recognizing a touch input.

First, the obtaining unit 121 obtains the information about the touch point to the input region 102 in step S201. At that time, the touch sensor on the touch panel display 115 detects the fact that the user has touched the input region 102 with the user's finger to operate the apparatus. Then, the obtaining unit 121 obtains the information about the touched position based on the information obtained from the touch sensor.

Figure 3:
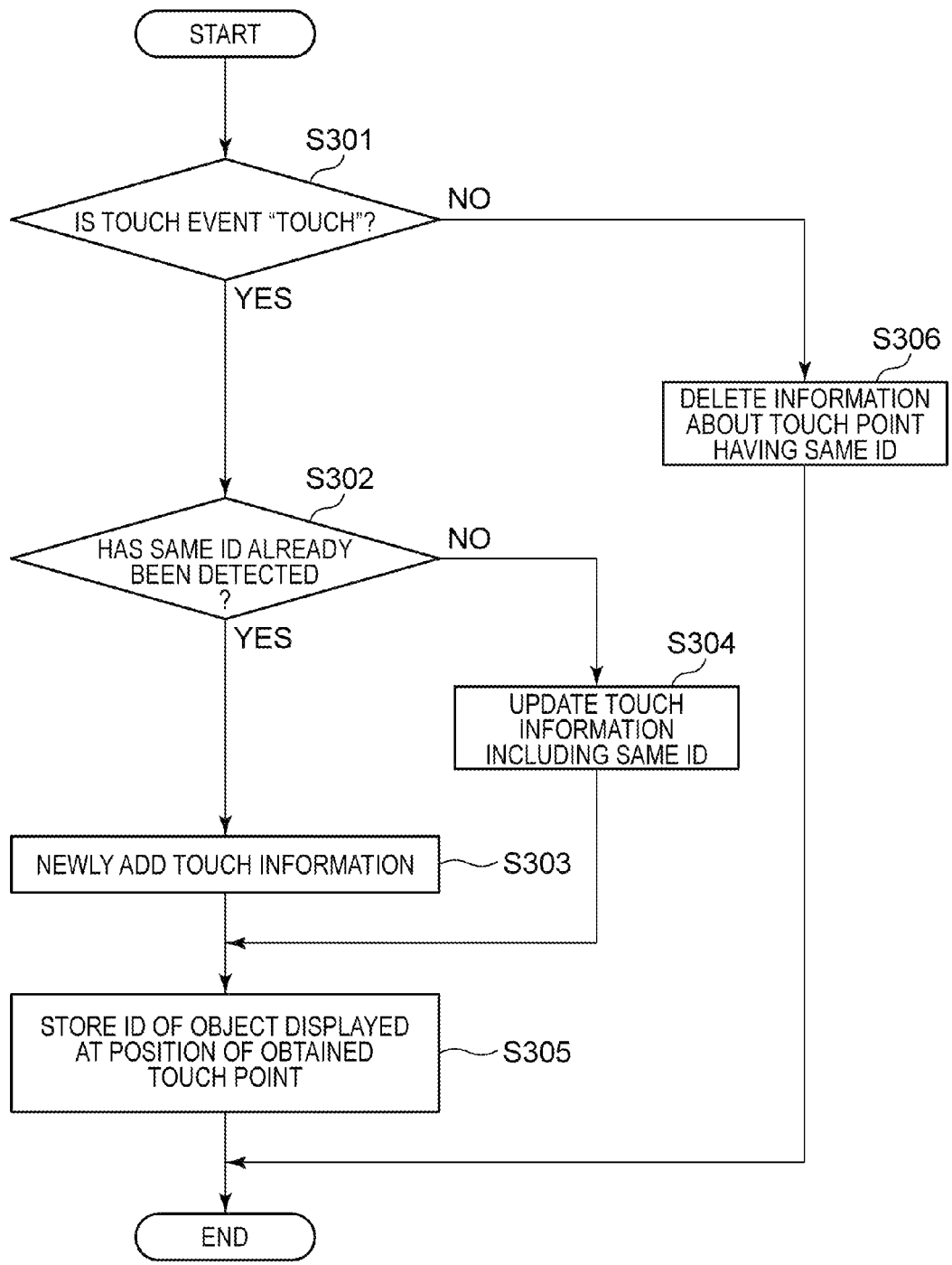
FIG. 3 is a flowchart for describing an exemplary flow of a process for obtaining a touch point.

Herein, FIG. 3 is a flowchart for describing the flow of a process for obtaining a touch point in step S201.

First, the obtaining unit 121 determines in step S301 whether the touch event notified from the touch sensor is a "TOUCH". The touch sensor used in the present exemplary embodiment notifies a touch event when obtaining the fact that the input region 102 is touched or when the obtained touch is released. In that case, when obtaining the fact that the input region 102 is touched, the touch sensor notifies a "TOUCH" as the touch event to the obtaining unit 121. When the obtained touch is released, the touch sensor notifies a "RELEASE" as the touch event to the obtaining unit 121. When it is determined that the notified touch event is a "TOUCH" (YES in step S301), the process goes to step S302. When the notified touch event is not a "TOUCH", or, in other words, is a "RELEASE" (NO in step S301), the process goes to step S307.

The obtaining unit 121 determines in step S302 whether a touch point having the same ID as the touch point of which touch event has been notified as the "TOUCH" has already been obtained. The obtaining unit 121 determines whether the same ID is included in the information stored in the first storage unit 123 with reference to the information. The ID of a touch point is identification data for identifying the touch point that the obtaining unit 121 has obtained. In the present exemplary embodiment, numbers 1, 2, . . . are assigned as the IDs in order of obtaining based on how many points have been touched before the touch point is touched in the input region 102. When it is determined that the touch point having the same ID has not been obtained (NO in step S302), the process goes to step S303. On the other hand, when it is determined that the touch point having the same ID has already been obtained (YES in step S302), the process goes to step S304.

The obtaining unit 121 newly adds the information about the ID, coordinates, and obtaining time of the touch point of which touch event has been obtained as a "TOUCH" to the information stored in the first storage unit 123 in step S303. Note that, as illustrated in FIG. 1A, the information about the position is represented by the coordinates x and y based on the plane of coordinates having the origin on the upper left of the input region 102 in the present exemplary embodiment.

The obtaining unit 121 newly adds the information about the ID, coordinates, and obtaining time of the touch point of which touch event has been obtained as a "TOUCH" to the information stored in the first storage unit 123 in step S303.

The obtaining unit 121 updates the information about the coordinates and obtaining time of the touch point having the same ID as the touch point of which touch event has been obtained as a "TOUCH" in the information stored in the first storage unit 123 in step S304.

Next, the obtaining unit 121 specifies the ID of the object displayed at the position of the obtained touch point with reference to the information about the object stored in the second storage unit 126 in order to store the ID in the first storage unit 123 in step S305. Then, the process returns to the process for recognizing a touch input (FIG. 2).

On the other hand, when the obtaining unit 121 determines NO in step S301, or, in other words, when the touch sensor notifies a touch event except for a "TOUCH", it means that a "RELEASE" is notified in the present exemplary embodiment. Thus, in step S306, the obtaining unit 121 deletes the position and obtaining time associated with the ID corresponding to the touch point of which touch event has been obtained as "RELEASE" and the ID information of the displayed object together with the ID of the touch point from the information stored in the first storage unit 123. Then, the process returns to the process for recognizing a touch input (FIG. 2).

Once the process has returned to the process for recognizing a touch input by the user, the determination unit 122 subsequently determines in step S202 whether the obtaining unit 121 has obtained a plurality of touch points. At that time, the determination unit 122 finds the number of touch points from the number of the stored IDs with reference to the information stored in the first storage unit 123 in order to determine whether a plurality of touch points has been obtained. When it is determined in step S202 that a plurality of touch points has been obtained (YES in step S202), the process goes to step S203. When it is determined that a plurality of touch points has not been obtained (NO in step S202), the process goes to step S208.

The determination unit 122 determines in step S203 whether the position of at least one of the obtained touch points is included in the predetermined range 103 preset in the input region 102. The determination unit 122 in the present exemplary embodiment determines whether at least a touch point is included in the predetermined range 103 with reference to the information stored in the first storage unit 123 and based on the coordinate values of the obtained touch point and a preset condition expression. When it is determined that the position of at least one of the obtained touch points is included in the predetermined range (YES in step S203), the process goes to step S204. On the other hand, when it is determined that all the positions of the obtained touch points are not included in the predetermined range (NO in step S203), the process goes to step S209.

The determination unit 122 determines the touch point included in the predetermined range 103 as a possibly invalid input in step S204 in order to store the information about a value "TRUE" of a flag on the possibly invalid input in the first storage unit 123 with associating the information to the ID of the specified touch point.

In step S205, the determination unit 122 determines the obtained touch point as a valid input or as an invalid input based on the object displayed in the input region 102. It is determined in the present exemplary embodiment based on the information about the object stored in the second storage unit 126 whether the object displayed at the position of the touch point included in the predetermined range 103 is associated with the object displayed at the position of the other touch point.

Figure 4:
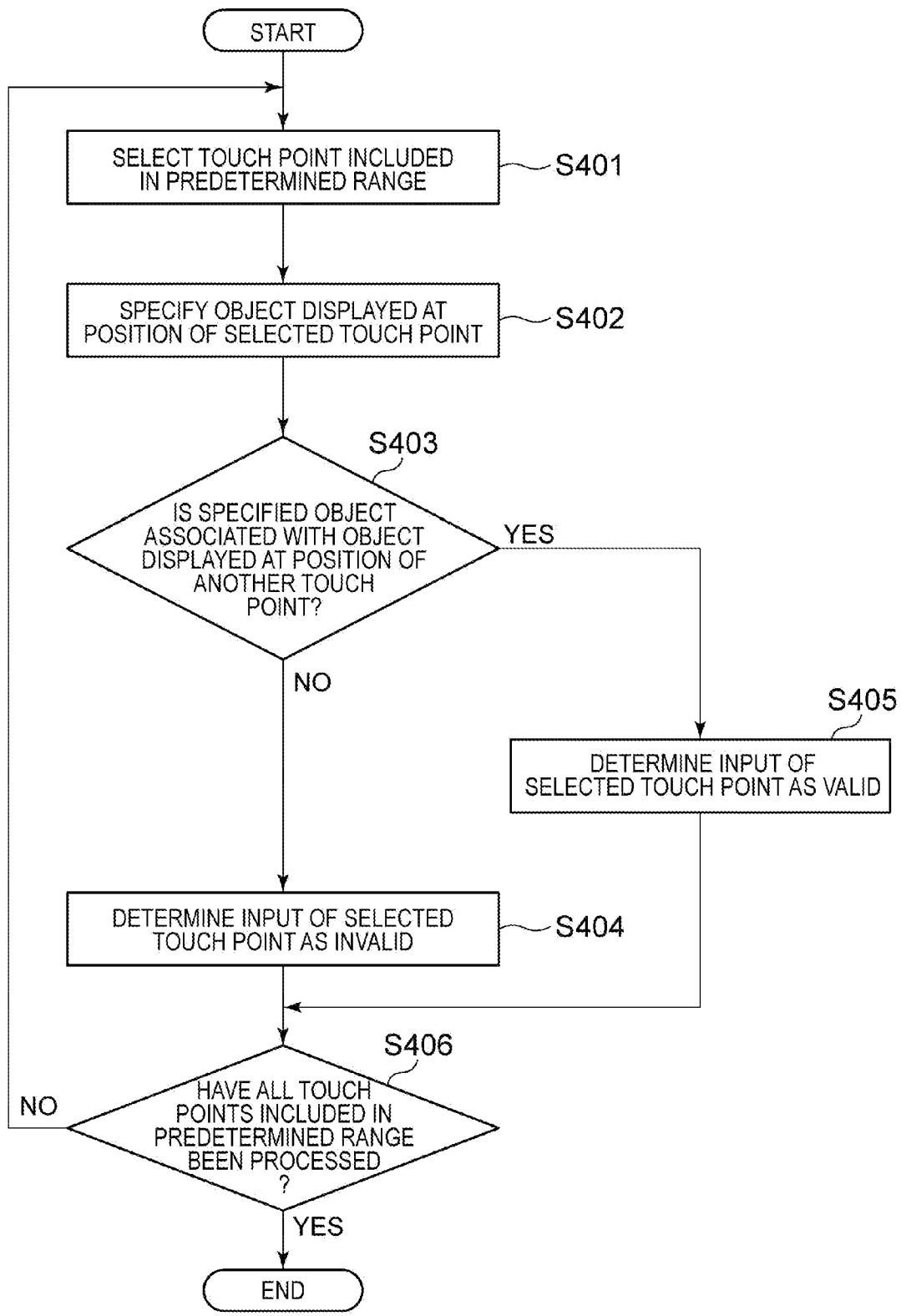
FIG. 4 is a flowchart for describing an exemplary flow of a determination process based on the information associating objects.

Herein, FIG. 4 is a flowchart for describing the flow of a determination process based on the displayed object in step S205.

First, in step S401, the determination unit 122 selects a touch point that has been recognized to be included in the predetermined range 103 in step S203. In the present exemplary embodiment, the determination unit 122 obtains an ID of the touch point associated with the flag on the possibly invalid touch point that is "TRUE" with reference to the information stored in the first storage unit 123. In the present exemplary embodiment, the determination unit 122 finds touch points associated with the flag on the possibly invalid touch point that is "TRUE" in ascending order of the ID number and selects the touch points one by one.

Next, in step S402, the determination unit 122 specifies the object displayed at the position of the selected touch point. The determination unit 122 in the present exemplary embodiment obtains the ID of the displayed object from the information associated with the ID of the touch point obtained in step S401 with reference to the information stored in the first storage unit 123.

The determination unit 122 determines in step S403 whether the specified object is associated with the object displayed at the position of the other touch point. In the present exemplary embodiment, the determination unit 122 determines, with reference to the information stored in the second storage unit 126 and associated with the ID of the displayed object that the determination unit 122 has obtained in step S402, whether there is an object associated with the displayed object having the ID. When there is an associated object, the determination unit 122 specifies the ID of the associated object and then determines whether there is a touch point associated with the displayed object having the ID among the touch points stored in the first storage unit 123. When there is a touch point associated with the displayed object having the ID, it is determined that the specified object is associated with the object displayed at the position of the other touch point. When it is determined that the specified object is associated with the object displayed at the position of the other touch point (YES in step S403), the process goes to step S405. When it is determined that the specified object is not associated with the object displayed at the position of the other touch point (NO in step S403), the process goes to step S404.

In step S404, the determination unit 122 determines the touch point selected in step S401 as an invalid input and maintains the value of the flag on the possibly invalid touch point as "TRUE". Then, the process goes to step S406.

On the other hand, the determination unit 122 determines the touch point selected in step S401 as a valid input in step S405. In other words, the touch point is eliminated from the touch points determined as possibly invalid inputs. At that time, the determination unit 122 updates, as "FALSE", the value of the flag on the possibly invalid touch point associated with the touch point having the ID specified in step S401 in the information stored in the first storage unit 123.

The determination unit 122 determines in step S406 whether all the touch points included in the predetermined range have been processed. In the present exemplary embodiment, at the completion of the search of the information about the touch point of which ID has the largest number among the touch points stored in the first storage unit 123, it is determined that all the touch points included in the predetermined range 103 have been processed. When it is determined that all the touch points included in the predetermined range have not been processed (NO in step S406), the process goes back to step S401 to select the touch point of which ID has the second largest number from among the touch points associated with the flag on the possibly invalid touch point that is "TRUE". When it is determined that all the touch points included in the predetermined range have been processed (YES in step S406), the determination process is terminated. Then, the process goes back to the flowchart in FIG. 2.

Once the process has returned to the process for recognizing a touch input by the user, the recognition unit 124 subsequently in step S206 recognizes the touch point that has not been determined as an invalid input as the result from the determination process in the determination unit 122. The recognition unit 124 in the present exemplary embodiment recognizes the information stored in the first storage unit 123 as the input of the coordinates of all the touch points associated with the flag on the possibly invalid touch point that is not "TRUE" with reference to the information in order to perform an appropriate process.

Then, in step S207, the display control unit 125 reflects the result from the input recognized with the recognition unit 124 in the output. In the present exemplary embodiment, the display control unit 125 reflects the result that is the operation indicated by the recognized input in the displayed image displayed on the touch panel display 115 and outputs the result.

On the other hand, the determination unit 122 determines in step S208 whether an obtained touch point is the touch point already determined as invalid by the determination unit 122. When an obtained touch point is the touch point remaining after the other touch points have not been obtained (have been released) and thus the obtained touch points have decreased to one, the touch point has already been determined by the determination unit 122. In that case, once a touch point has been determined as an invalid input, it is preferable that the touch point continues to be determined as an invalid input. Thus, the determination in step S207 is performed. When an obtained touch point has already been determined as invalid by the determination unit 122, it is highly possible that the touch point is touched by the finger touching the input region 102 in order to carry the information processing apparatus 100. Thus, the touch point is continuously determined as invalid in the present exemplary embodiment. When it is determined that the obtained touch point is the touch point that has already been determined as invalid by the determination unit 122 (YES in step S208), the process goes to step S206. On the other hand, when it is determined that the obtained touch point is not the touch point that has already been determined as invalid by the determination unit 122 (NO in step S208), the process goes to step S209.

In step S209, the determination unit 122 determines all the obtained touch points as valid inputs and then notifies the information indicating the determination result to the recognition unit 124.

Note that, although the touch panel that notifies a "TOUCH" as the touch event when the touch sensor has obtained a touch, and notifies a "RELEASE" as the touch event when the obtained touch has been released is used in the present exemplary embodiment, the present invention is not limited to the embodiment. For example, a "TOUCH_DOWN" can be notified as the touch event when the input region 102 has newly been touched, a "MOVE" can be notified as the touch event when the motion of the touch point having the obtained ID has been obtained, or a "TOUCH_UP" can be notified as the touch event when the touch has been released. In such a case, when a "TOUCH_DOWN" is notified, the information to be stored in the first storage unit 123 is newly added and associated with the ID. When a "MOVE" is notified, the information associated with the same ID is updated. When a "TOUCH_UP" is notified, the information associated with the same ID is deleted.

As described above, the information processing apparatus 100 manages the information by identifying a plurality of touch points obtained on the touch panel working as an input device using the IDs. Thus, the information processing apparatus 100 can obtain each motion of the touch points and can recognize a multi-touch operation configured on the touch points.

Hereinafter, an exemplary operation in which the user operates the information processing apparatus 100 according to the first exemplary embodiment will specifically be described with reference to FIGS. 5A to 8E.

First, FIGS. 5A to 5C are examples of the display state of an object and the association information. FIG. 5A illustrates an exemplary state of the user interface displayed when the information processing apparatus 100 is used as a camera. In that case, a captured image 500 taken with an imaging unit (not illustrated in the drawings), an object 501, an object 502, and an object 503 are displayed in the input region 102. The objects work as the interfaces of the information processing apparatus 100 and play roles as icons for calling the adjustment function of the zoom level of the camera, the adjustment function of the ISO speed, and the adjustment function of the shutter speed (hereinafter, merely referred to as "shutter speed"). FIG. 5B illustrates that the user indicates the object 501 with a touch point 504 and thus an object 505 is newly displayed. A function as a zoom adjustment bar is allotted to the object 505 because the touch point 504 has indicated the icon for calling the zoom level adjustment function (hereinafter, merely referred to as "zoom"). Similarly, a function as an ISO adjustment bar is allotted to the object 505 when the object 502 corresponding to the adjustment function of the ISO speed (hereinafter, merely referred to as "ISO") is indicated. A function as a shutter speed adjustment bar is allotted to the object 505 when the object 503 corresponding to the adjustment function of the shutter speed (hereinafter, merely referred to as "shutter speed") is indicated.

FIG. 5C is a table showing an example of the information stored in the second storage unit 126. IDs for identifying the displayed objects and the association information for associating the object to the other object are stored in the table. For example, as illustrated in FIG. 5B, indicating the object 501 corresponding to the "zoom" displays the object 505 corresponding to the zoom adjustment bar. Thus, in FIG. 5C, the object corresponding to the "zoom" and having an ID 1 and the object corresponding to the zoom adjustment bar and having an ID 1-1 stores the IDs of each other as the association information. The "ISO" and the "shutter speed" are similar.

Figure 6A:
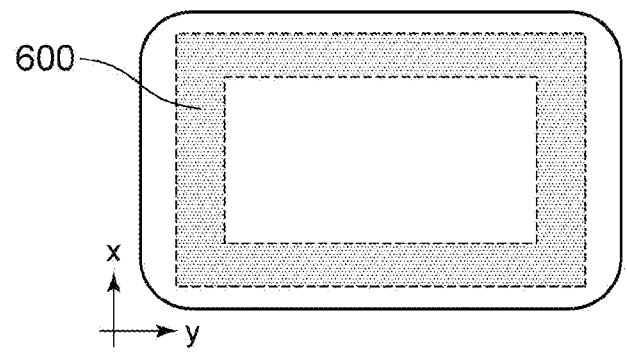
FIGS. 6A to 6D are diagrams of an exemplary operation on the information processing apparatus.

Next, FIGS. 6A to 6D illustrate an exemplary operation of the information processing apparatus 100 described in FIGS. 5A to 5C. First, as illustrated in FIG. 6A, the information processing apparatus 100 is rotated 90 degrees counterclockwise from the state in FIG. 1A. Thus, the input region 102 on the touch panel display 115 can manage the positional information as a plane of coordinates that has a resolution of 480 [dot]×640 [dot] and has the origin on the lower left of the drawing. In the examples in FIGS. 6A to 6D, a range having 20 [dot] in width is previously set as the predetermined range 103 from the outer edge of the input region 102. FIGS. 8A to 8C are tables showing examples of the information that has been obtained by the obtaining unit 121 and has been stored in the first storage unit 123 in the states in FIGS. 6B to 6D.

Figure 6B:
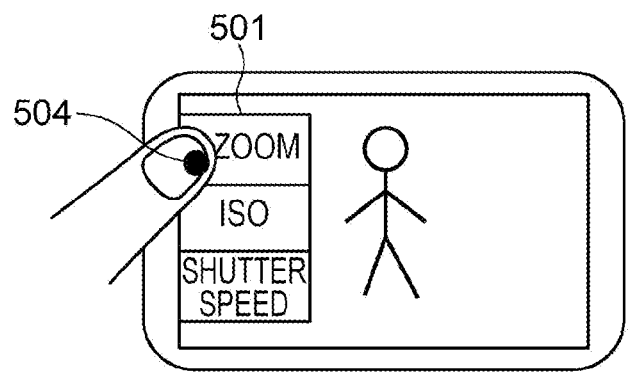

FIG. 6B illustrates that the user has touched the object 501 displayed in the input region 102 and thus the touch point 504 has been obtained (step S201). As illustrated in FIG. 8A, the obtaining unit 121 obtains the positional coordinates that are the x-coordinate (380 [dot]) and the y-coordinate (10 [dot]) and the ID 1 indicating the object 501 displayed at the position with respect to the touch point having the ID 1 indicating that the touch point has been touched first. At that time, a plurality of touch points has not been obtained (NO in step S202), and the obtained touch point has not already been determined as invalid (NO in step S208). Thus, the operation with the touch point 504 is recognized (step S206). Thus, as illustrated in FIG. 6C, the object 505 that is the zoom adjustment bar is displayed as the output of the operation result (step S207).

Figure 6C:
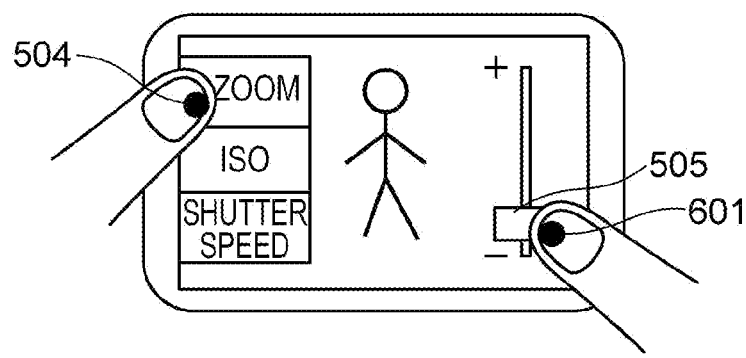

Next, FIG. 6C illustrates that the user has newly touched the object 505 and thus a touch point 601 has been obtained (step S201). As illustrated in FIG. 8B, the obtaining unit 121 obtains the positional coordinates that are the x-coordinate (80 [dot]) and the y-coordinate (620 [dot]) and the ID 1-1 indicating the object 505 displayed at the position with respect to the touch point having an ID 2 indicating that the touch point has been touched secondarily. At that time, a plurality of touch points has been obtained (YES in step S202). Thus, the determination unit 122 determines whether the position of at least one of the touch points is included in the predetermined range 103. In the example, both of the touch point having the ID 1 and the touch point having the ID 2 are included in the range having 20 [dot] in width from the outer edge in a Y-axis direction (YES in step S203). Thus, the determination unit 122 obtains the two touch points (ID=1 and ID=2) included in the predetermined range 103 (step S204). Then, the determination unit 122 first selects the touch point having the ID 1 (step S401) and determines whether there is an object associated with the object 501 having the ID 1 and displayed at the position of the selected touch point (step S403). In the example, the determination unit 122 determines based on the table in FIG. 5C that there is the object 505 having the ID 1-1. It is determined based on the table stored in the first storage unit 123 in FIG. 8B that the touch point having the ID 2 is associated with the object having the ID 1-1. Thus, the touch point having the ID 1 is determined as a valid input and the flag on the possibly invalid touch point becomes "FALSE" because the specified object is associated with the object displayed at the position of the other touch point (YES in step S403). Similarly, the touch point having the ID 2 is also determined as a valid input and the flag on the possibly invalid touch point becomes "FALSE" (step S405). Note that, when the displayed object associated with a touch point included in the predetermined range 103 has been associated as the displayed object of the other touch point included in the predetermined range 103, the touch points can constantly be determined as valid inputs.

Figure 6D:
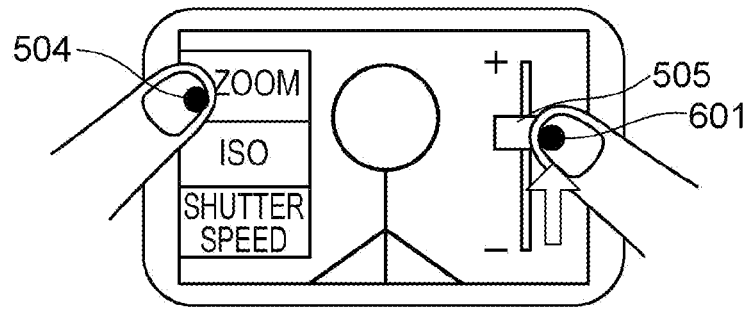

FIG. 6D illustrates the information processing apparatus 100 in which the operation for adjusting the zoom level is continuously input because the two touch points are determined as valid inputs. In that case, moving the touch point 601 having the ID 2 in the positive direction of the positive X-axis zooms in the captured image (step S207). FIG. 8C illustrates an example of the information stored in the first storage unit 123 at that time. Both of two touch points associated with the flag on the possibly invalid touch point that is "FALSE" are determined as valid inputs. Thus, it is found that the operation configured with the touch points is recognized.

Figure 7A:
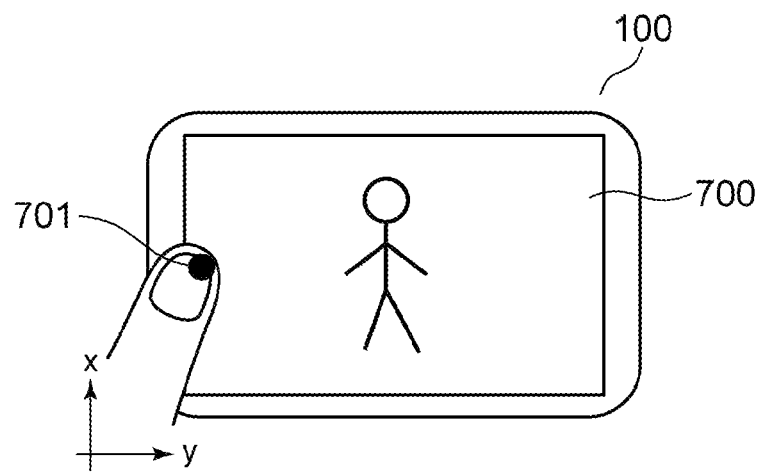
FIGS. 7A to 7C are diagrams of an exemplary operation on the information processing apparatus.
Figure 7B:
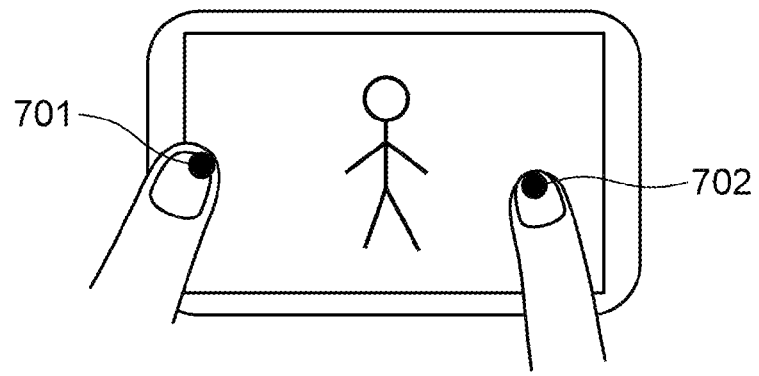
Figure 7C:
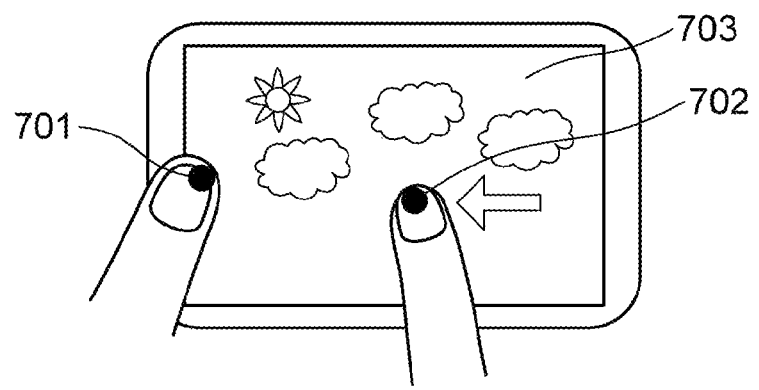

Next, FIG. 7A to 7C illustrates that the user browses an image 700 of a person on the information processing apparatus 100. In that case, the image 700 is associated with the object ID=4 in the table in FIG. 5C, similarly to the captured image 500 in FIG. 5A.

FIG. 7A illustrates that the user's thumb has touched the input region 102 when the user carries the information processing apparatus 100 with the user's left hand and thus a touch point 701 has been obtained. As illustrated in FIG. 8D, the obtaining unit 121 obtains the positional coordinates that are the x-coordinate (220 [dot]) and the y-coordinate (10 [dot]) and the ID=4 indicating the image 700 displayed at the position with respect to the touch point having the ID 1 indicating that the touch point has been touched first. At that time, the touch point 701 is determined as a valid input in the same process as in FIG. 6B. However, the process that the information processing apparatus 100 performs is not associated with the operation in which the image 700 is touched on the operation screen. Thus, the output displayed image does not change.

Next, FIG. 7B illustrates that the user further touches the input region 102 in order to change the image displayed in the input region 102. FIG. 8E is an example of the information about the touch points obtained at that time stored in the first storage unit 123. A touch point 702 having the ID 2 indicating that the touch point has been touched secondarily is associated with the positional coordinates that are the x-coordinate (200 [dot]) and the y-coordinate (600 [dot]) and the ID=4 indicating the image 700 displayed at the position.

Next, FIG. 7B illustrates that the touch point 702 that has been touched when the user has further touched the input region 102 in order to change the image displayed in the input region 102 is obtained (step S201). As illustrated in FIG. 8E, the obtaining unit 121 obtains the positional coordinates that are the x-coordinate (200 [dot]) and the y-coordinate (600 [dot]) and the ID 4 indicating the image 700 displayed at the position with respect to the touch point 702 having the ID 2 indicating that the touch point has been touched secondarily. At that time, a plurality of touch points has been obtained (YES in step S202). Thus, the determination unit 122 determines whether the position of at least one of the obtained touch points is included in the predetermined range 103. In the example, the touch point having the ID 1 is included in the range having 20 [dot] in width from the outer edge in the Y-axis direction (YES in step S203). Thus, the determination unit 122 obtains the touch point (ID=1) included in the predetermined range 103 (step S204). Then, the determination unit 122 determines whether there is an object associated with the image 700 having the ID 4 and displayed at the position of the obtained touch point (step S403). When it is determined based on the table stored in the second storage unit 126 in FIG. 5C that there is not an object associated with the image 700 having the ID 4, the touch point 701 is determined as an invalid input (step S404). Thus, the flag on the possibly invalid touch point associated with the touch point having the ID 1 becomes "TRUE" and the flag on the possibly invalid touch point associated with the touch point having the ID 2 becomes "FALSE" in FIG. 8E.

FIG. 7C illustrates that a flick operation (operation by a quick flip on the screen) in a direction of arrow on the valid touch point 702 slides the currently-displayed image 700 and thus displays an image of a landscape that differs from the image 700 (step S207).

As described above, according to the present exemplary embodiment, a touch point in the range highly possibly touched by a finger for carrying the apparatus in the region in which a touch-operation is to be performed is determined as an input that is possibly not recognized. Then, it is determined whether to recognize the touch point based on the display contents on the touch point determined as an input that is possibly not recognized. This can efficiently select a touch point to be invalid without a restriction on the contents allowed to be displayed on the display screen, and thus can reduce the malfunctions of the information processing apparatus 100.

(Second Embodiment)

In the first exemplary embodiment, when a plurality of touch points is obtained, the touch points are processed based on whether the object displayed on a touch point included in the predetermined range 103 is associated with the object displayed on the other touch point, regardless of the order in which the touch points have been touched. On the other hand, in the second exemplary embodiment, the latest touch point among the obtained touch points (hereinafter, abbreviated to "the latest touch point") is determined as a valid input regardless of the position because it is highly possible that the user has touched the latest touch point in order to start a new operation. Note that the latest touch point includes the latest obtaining time obtained when a touch has been started or the position of the touch has been moved. Among the touch points included in the predetermined range 103, the touch point on which the object associated with the object displayed at the latest touch point is displayed is determined as a valid input.

An information processing apparatus 100 according to the second exemplary embodiment has the same appearance, hardware configuration, and functional configuration as in the first exemplary embodiment in FIG. 1A to 1C. However, a determination unit 122 in the second exemplary embodiment determines the touch points except for the latest touch point in the predetermined range 103 as possibly invalid inputs. When an object associated with the object displayed at the latest touch point is displayed on the position of each touch point determined as a possibly invalid input, the touch point is determined as a valid input. When an object associated with the object displayed at the latest touch point is not displayed on the position of each touch point determined as a possibly invalid input, the touch point is determined as an invalid input. The contents of the processes in the other functional units are performed accordance with the first exemplary embodiment.

Figure 9:
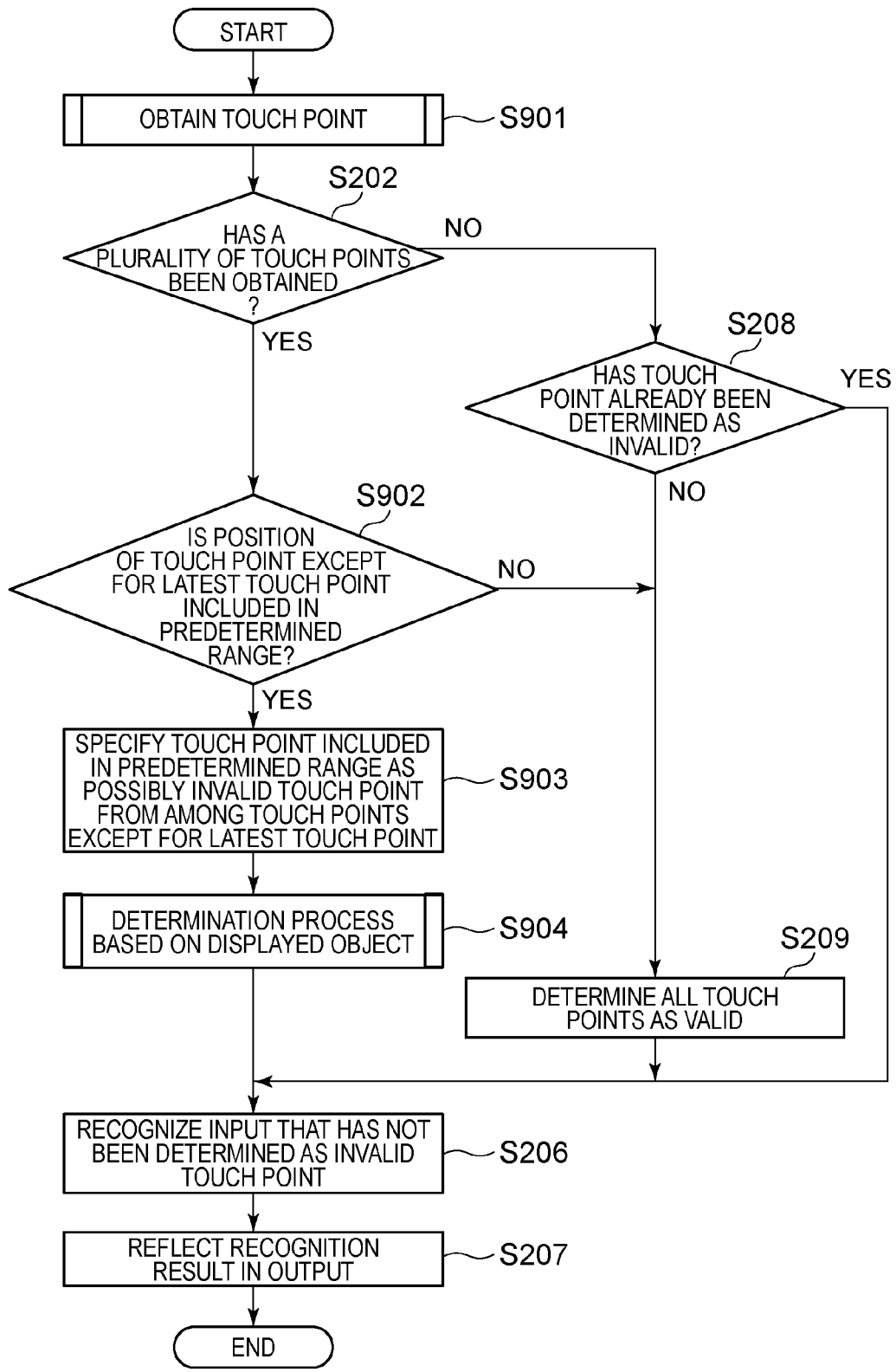
FIG. 9 is a flowchart for describing an exemplary flow of a process for recognizing a touch input by the user.

FIG. 9 is a flowchart for describing a process for recognizing a touch input by the user in an exemplary variation 1. A process having the same contents as in the first exemplary embodiment is performed in steps having the same numbers as in FIG. 2. Thus, the detailed descriptions of the overlapped contents will be omitted. The different points from the first exemplary embodiment will mainly be described.

In the second exemplary embodiment, the obtaining unit 121 first obtains the information about a touch point to the input region 102 in step S901. In the present exemplary embodiment, the obtained information is processed in accordance with the flowchart in FIG. 10 to be described below.

Figure 10:
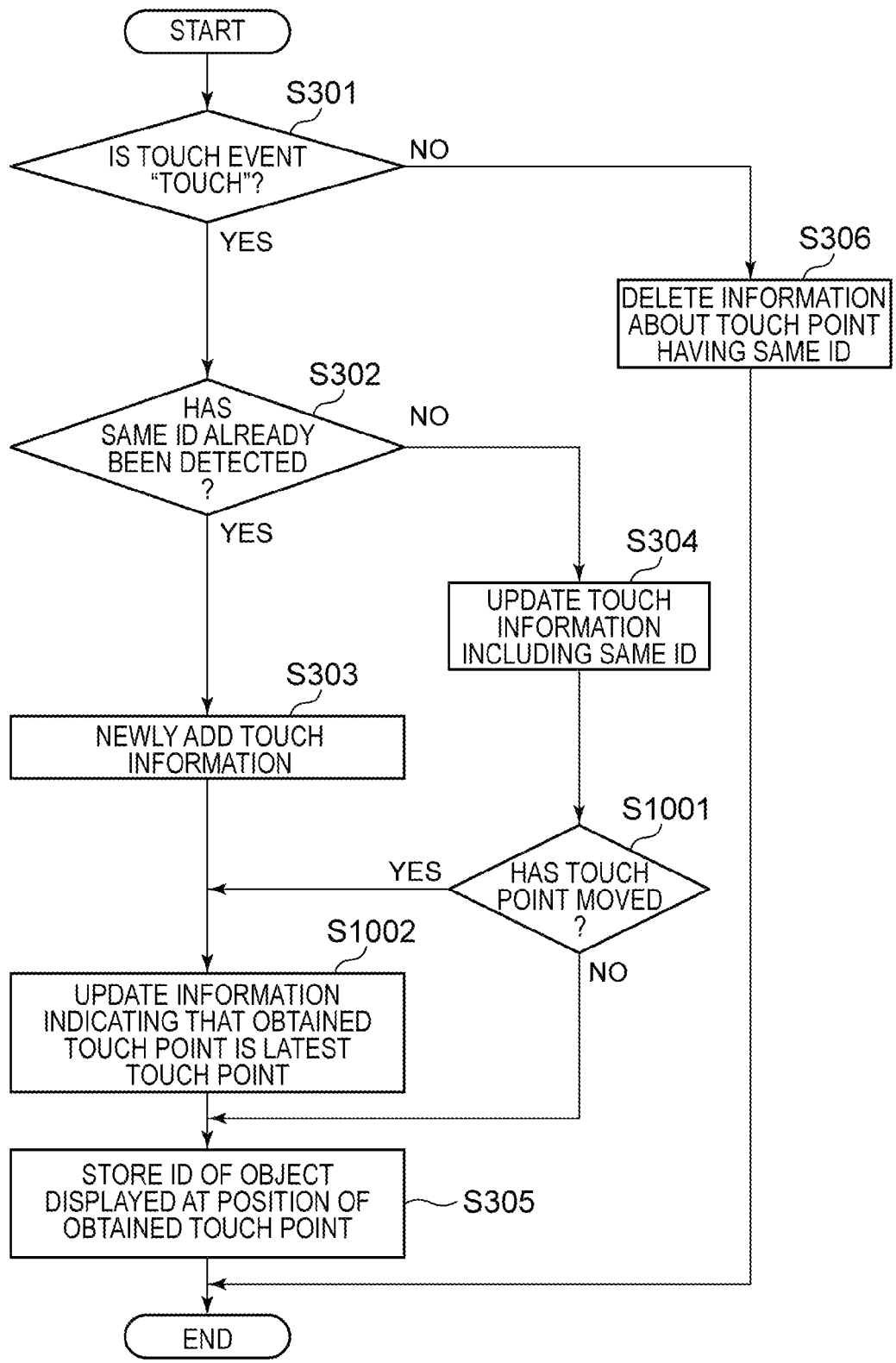
FIG. 10 is a flowchart for describing an exemplary flow of a process for obtaining a touch point.

In the flowchart in FIG. 10, a process having the same contents as in the first exemplary embodiment is performed in steps having the same numbers as in FIG. 3. Thus, the detailed descriptions of the overlapped contents will be omitted. The different points from the first exemplary embodiment will mainly be described.

In the second exemplary embodiment, once the obtaining unit 121 has completed updating the information about the touch point having the same ID as the obtained touch point in the information stored in a first storage unit 123 in step S304, the process goes to step S1001.

The obtaining unit 121 determines in step S1001 whether the obtained touch point has moved from the previously obtained position. In the present exemplary embodiment, when updating the information about the touch point in step S304, the obtaining unit 121 temporarily stores the information indicating whether the positional information is identical before and after the update so as to use the information for the determination in step S1001. When it is determined that the obtained touch point has moved (YES in step S1001), the process goes to step S1002. On the other hand, when it is determined that the obtained touch point has not moved (step S1002), the process goes to step S305.

In the second exemplary embodiment, also when the obtaining unit 121 has completed newly adding the information of a touch point to the information stored in the first storage unit 123 in step S303, the process goes to step S1002.

In step S1002, the obtaining unit 121 updates the information indicating that the obtained touch point is the latest touch point. In the present exemplary embodiment, a value "TRUE" of a flag on the latest touch point is stored and associated with the ID of the touch point having the latest obtaining time as the information indicating the touch point is the latest touch point in the information about the touch points stored in the first storage unit 123. The touch point to be associated with the value "TRUE" of the flag on the latest touch point is updated in step S1002. Then, the process goes to step S305.

Similarly to the first exemplary embodiment, the ID of the object displayed on the position of the obtained touch point is specified and stored in the first storage unit 123 in step S305. Then, the process returns to the process for recognizing a touch input (FIG. 2).

In the second exemplary embodiment, when the determination unit 122 determines in step S202 that the obtaining unit 121 has obtained a plurality or touch points (YES in step S202), the process goes to step S902.

The determination unit 122 determines in step S902 whether the position of a touch point except for the latest touch point is included in the predetermined range 103. In the present exemplary embodiment, it is determined with reference to the information stored in the first storage unit 123 whether the positional information of the touch point associated with the flag on the latest touch point that is not "TRUE" is included in the predetermined range 103. When there is the touch point included in the predetermined range 103, it is determined that the position of a touch point except for the latest touch point is included in the predetermined range 103 (YES in step S902). Then, the process goes to step S903.

In step S903, from among the touch points except for the latest touch point, the determination unit 122 specifies the touch point included in the predetermined range as a touch point determined as a possibly invalid input to link the value "TRUE" of the flag on the possibly invalid touch point to the ID of the included touch point and store the flag.

Figure 11:
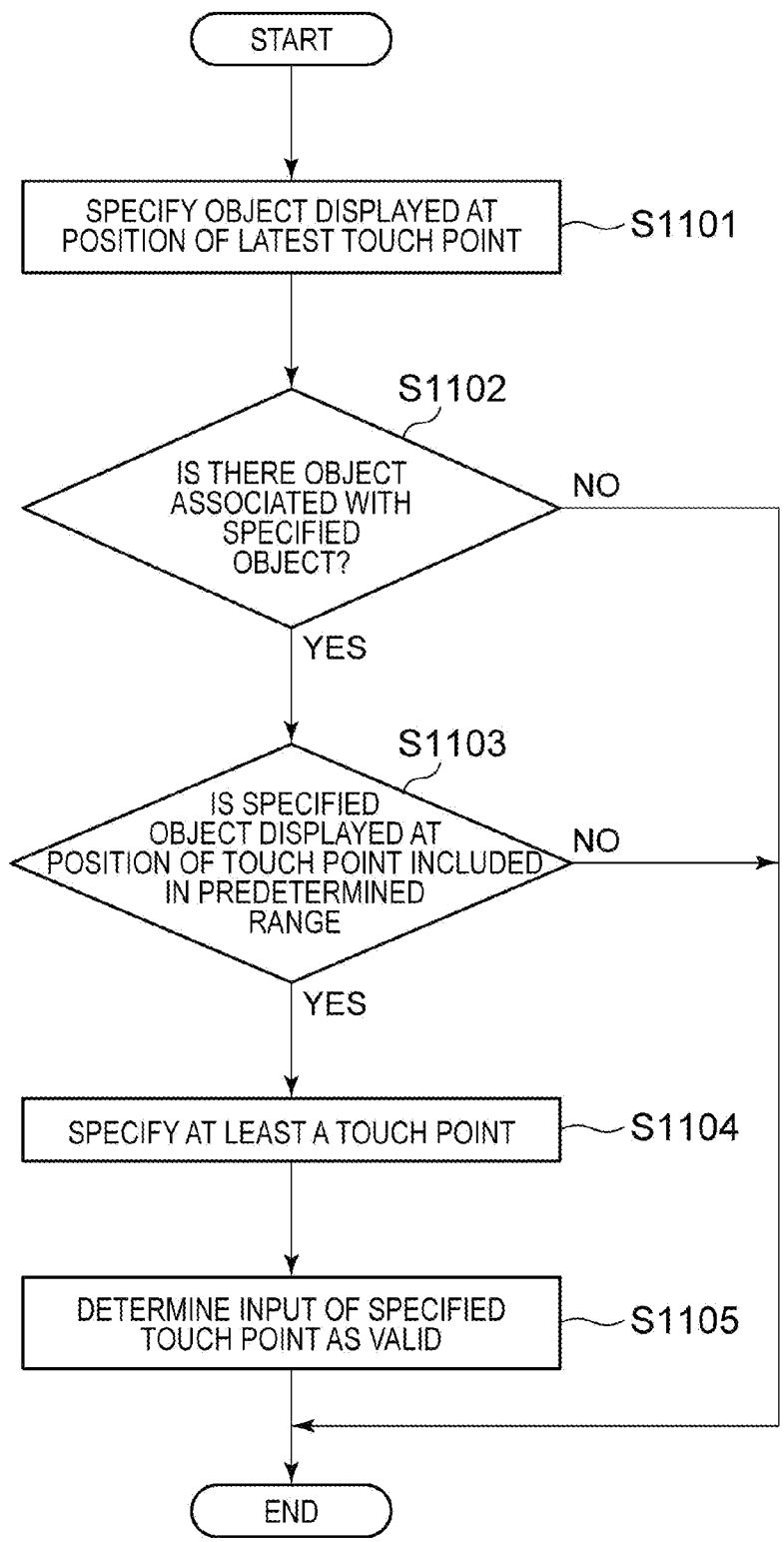
FIG. 11 is a flowchart for describing an exemplary flow of a determination process based on the information associating objects.

In step S904, a determination process based the object displayed on the position of a touch point is performed in accordance with the flowchart in FIG. 11.

In the flowchart in FIG. 11, the determination unit 122 first specifies the object displayed on the position of the latest touch point in step S1101. The determination unit 122 refers to the information stored in the first storage unit 123 in order to specify the displayed object associated with the touch point associated with the flag on the latest touch point that is "TRUE" and obtain the ID of the displayed object.

Next, the determination unit 122 determines in step S1102 whether there is the other displayed object associated with the object specified in step S1101. In the present exemplary embodiment, it is determined with reference to the information stored in a second storage unit 126 whether the ID of the other displayed object is stored as the association information in the object having the obtained ID. When it is determined that there is the other displayed object associated with the specified object (YES in step S1102), the ID of the other displayed object is obtained. Then, the process goes to step S1103. On the other hand, when it is determined that there is not the other displayed object associated with the specified object (NO in step S1102), the process goes back to the flowchart in FIG. 9.

The determination unit 122 determines in step S1103 whether the object associated with the specified object is displayed at the position of the touch point included in the predetermined range. In the present exemplary embodiment, it is determined that the object associated with the specified object is displayed at the position of the touch point included in the predetermined range when the ID of the displayed object obtained in step S1102 is included in the information stored in the first storage unit 123. When it is determined that the object associated with the specified object is displayed at the position of the touch point included in the predetermined range (YES in step S1103), the process goes to step S1104. On the other hand, it is determined that the object associated with the specified object is not displayed at the position of the touch point included in the predetermined range (NO in step S1103), the process goes back to the flowchart in FIG. 9.

In step S1104, the determination unit 122 specifies at least a touch point on which the object associated with the specified object is displayed. In the present exemplary embodiment, the ID of at least a touch point associated with the ID of the object obtained in step S1102 is obtained with reference to the information stored in the first storage unit 123.

The determination unit 122 determines at least a specified touch point as a valid input in step S1105. In other words, the determination unit 122 eliminates the touch point from the touch points determined as possibly invalid inputs. Thus, the value of the flag on the possibly invalid touch point associated with the obtained ID is updated as "FALSE". Then, the process returns to the flowchart in FIG. 9.

Note that the description of the following process in and after step S206 will be omitted because the process is performed in the same manner as the first exemplary embodiment.

Hereinafter, an example in which the user operates the information processing apparatus 100 according to the second exemplary embodiment will be described in detail with reference to FIGS. 12A to 12E, 13A to 13D, and 14A to 14D.

FIG. 12 is an example of the zoom operation of the camera function in the information processing apparatus 100. The example is the same as the description using FIGS. 5 and 6 in the first exemplary embodiment. In that case, the second storage unit 126 similarly stores the table illustrated in FIG. 5C. The table stores the IDs for identifying the displayed objects and the association information for associating the object to the other object. The state of the operation illustrated in FIG. 12A corresponds to the state in FIG. 6B. The state of the operation illustrated in FIG. 12A corresponds to the state in FIG. 6C. FIGS. 12C to 12E correspond to FIGS. 8A to 8C.

FIG. 12A illustrates that the user has touched an object 501 displayed in an input region 102 and thus a touch point 1201 has been obtained (step S901). As illustrated in FIG. 12C, the obtaining unit 121 obtains the positional coordinates that are the x-coordinate (380 [dot]) and the y-coordinate (10 [dot]) and an ID 1 indicating the object 501 displayed at the position with respect to the touch point that has the ID 1 and has been touched first. The flag on the latest touch point that is "TRUE" is associated as the information indicating that the touch point is the latest touch point at that time to the touch point having the ID 1 (step S1002). At that time, a plurality of touch points have not been obtained (NO in step S202), and the obtained touch point has not already been determined as invalid (NO in step S208). Thus, the operation with the touch point 504 is recognized (step S206). Thus, as illustrated in FIG. 6C, the object 505 that is the zoom adjustment bar is displayed as the output of the operation result (step S207).

Next, FIG. 12B illustrates that the user has newly touched the object 505 and thus a touch point 1202 has been obtained (step S901). As illustrated in FIG. 12D, the obtaining unit 121 obtains the positional coordinates that are the x-coordinate (80 [dot]) and the y-coordinate (620 [dot]) and an ID 1-1 indicating the object 505 displayed at the position with respect to the touch point that has the ID 2 and has been touched secondarily. The flag on the latest touch point that is "TRUE" is associated as the information indicating that the touch point is the latest touch point at that time to the touch point having the ID 2 and the value of the flag on the latest touch point associated with the touch point having the ID 1 is updated as "FALSE" (step S1002). At that time, a plurality of touch points has been obtained (YES in step S202). Thus, the determination unit 122 determines whether the position of the touch point except for the latest touch point and having the ID 1 is included in the predetermined range 103. In the example, Both of the positional coordinates of the touch point 1201 having the ID 1 are included in the range having 20 [dot] in width from the outer edge in the Y-axis direction (YES in step S902). Thus, the determination unit 122 links the flag on the possibly invalid touch point that is "TRUE" to the touch point (ID=1) included in the predetermined range 103 and stores the flag (step S903). Next, the ID 1-1 is specified as the ID of the object displayed at the latest touch point 1201 (step S1101). Further, the object 501 (ID=1) associated with the object having the ID 1-1 is specified with reference to the information stored in the second storage unit 126 and illustrated in FIG. 5C (YES in step S1102). In that case, the value 1 indicating the object 501 is stored at the portion for storing the ID of the displayed object in the table in FIG. 12D that is the information stored in the first storage unit 123 (YES in step S1103). Based on the table in FIG. 12D, the touch point is specified as the touch point 1202 (ID=1) (step S1104) and the touch point 1202 is determined as a valid input. As illustrated in FIG. 12E, the value of the flag on the possibly invalid touch point associated with the touch point having the ID 1 is updated as "FALSE". Thus, both inputs of the touch point 1201 and the touch point 1202 are recognized (step S206), similarly to the first exemplary embodiment described in FIG. 6.

FIGS. 13A to 13D illustrate an exemplary scroll operation of the browser in the information processing apparatus 100. FIGS. 14A to 14D illustrate examples of the information about the scroll operation described herein stored in the first storage unit 123 and the second storage unit 126.

Figure 13A:
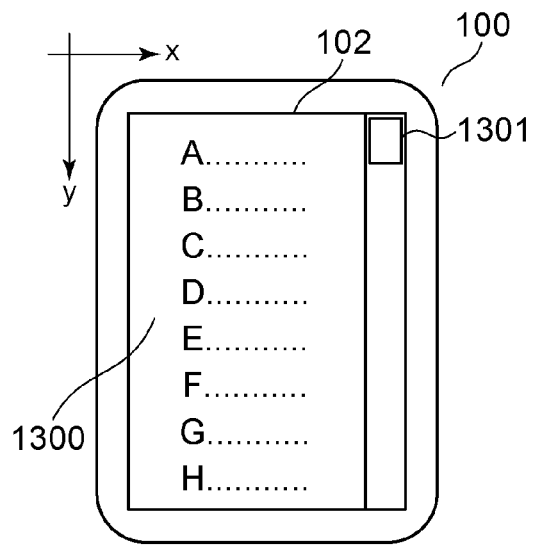
FIGS. 13A to 13D are diagrams of an exemplary operation on the information processing apparatus.

First, FIG. 13A illustrates an exemplary state of the user interface displayed on the information processing apparatus 100. Herein, an image 1300 displaying a WEB page including text information and a scroll bar 1301 are displayed as an example in the input region 102. The scroll bar 1301 is a component included in the user interface on the information processing apparatus 100 and plays a role for changing a part of the WEB page displayed by the browser by designating a position relative to the entire length of the WEB page. A vertical flick operation on the screen 1300 can also change a part displayed in the input region 102 on the WEB page. FIG. 14A illustrates an exemplary table of the information stored in the second storage unit 126. The table stores the ID for identifying the displayed objects and the association information for associating the object to the other object. In that case, the table stores the information about the object of the image 1300 that is the display region of the browser and that has the ID 1, and the information about the object that is the scroll bar 1301 and that has the ID 2. The two objects are not associated with each other because being operated by independent touch-operations.

Figure 13B:
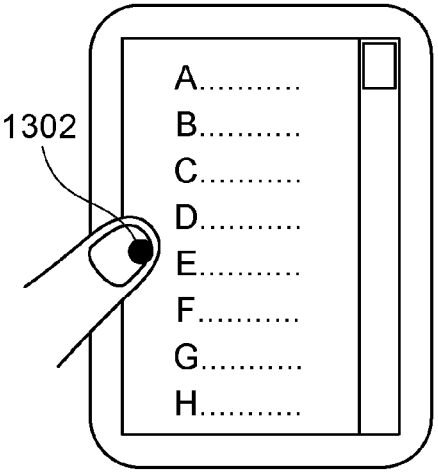

FIG. 13B illustrates that the user's thumb has touched the input region 102 when the user carries the information processing apparatus 100 with the user's left hand and thus a touch point 701 has been obtained. As illustrated in FIG. 14B, the obtaining unit 121 obtains the x-coordinate (10 [dot]) and the y-coordinate (320 [dot]) of the touch point having the ID 1 indicating that the touch point has been touched first, and the ID 1 indicating the image 1300 that is the display region of the browser displayed at the position (step S901). At that time, the flag on the latest touch point that is "TRUE" is associated as the information indicating that the touch point is the latest touch point at that time to the touch point having the ID 1 (step S1002). At that time, a plurality of touch points have not been obtained (NO in step S202), and the obtained touch point has not already been determined as invalid (NO in step S208). Thus, the operation with the touch point 1302 is recognized (step S206). However, the touch point 1302 has not been moved. Thus, the flick operation for a scroll is not recognized and the displayed contents have not changed (step S207).

Figure 13C:
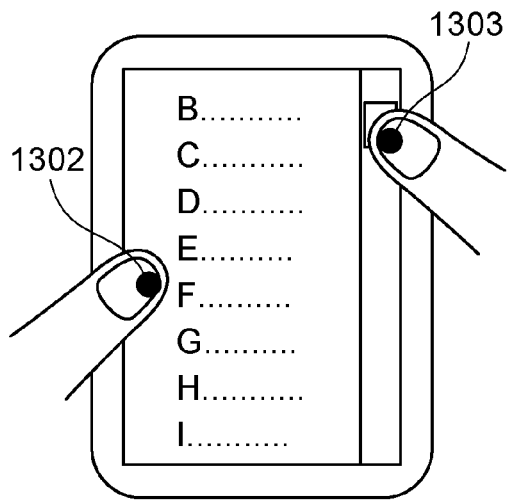

Next, FIG. 13C illustrates that the user has newly touched the scroll bar 1301 and thus a touch point 1303 has been obtained (step S901). As illustrated in FIG. 14C, the obtaining unit 121 obtains the positional coordinates that are the x-coordinate (470 [dot]) and the y-coordinate (100 [dot]) and the ID 2 indicating the scroll bar 1301 displayed at the position with respect to the touch point that has the ID 2 and that has been touched secondarily. The flag on the latest touch point that is "TRUE" is associated as the information indicating that the touch point is the latest touch point at that time to the touch point having the ID 2 and the value of the flag on the latest touch point associated with the touch point having the ID 1 is updated as "FALSE" (step S1002). At that time, a plurality of touch points has been obtained (YES in step S202). Thus, the determination unit 122 determines whether the position of the touch point except for the latest touch point and having the ID 1 is included in the predetermined range 103. In the example, the touch point having the ID 1 is included in the range having 20 [dot] in width from the outer edge in the X-axis direction (YES in step S902). Thus, the determination unit 122 links the flag on the possibly invalid touch point that is "TRUE" to the touch point (ID=1) included in the predetermined range 103 and stores the flag (step S903). Next, the ID 2 is specified as the ID of the object displayed at the latest touch point 1302 (step S1101). Further, it is determined that there is not an object associated with the object having the ID 2 with reference to the information stored in the second storage unit 126 and illustrated in FIG. 14A (NO in step S1102). Thus, the value "TRUE" of the flag on the possibly invalid touch point associated with the touch point 1302 (ID=1) and the value "FALSE" of the flag on the possibly invalid touch point associated with the touch point 1303 (ID=2) are maintained. The input of the touch point 1303 is recognized as the operation for designating the point of the scroll bar 1301 (step S206). Thus, the contents of the image 1300 partially change (step S207).

Figure 13D:
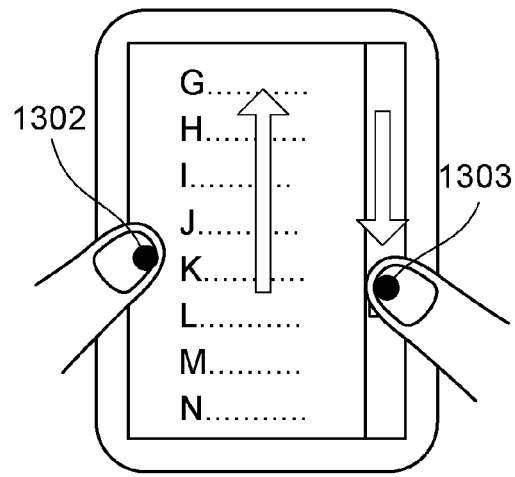

FIG. 13D illustrates that the touch point 1303 is determined as a valid input (step S206) and thus the contents displayed by the browser are scrolled and the image 1300 changes. In that case, moving the touch point 1303 having the ID 2 in the positive direction of the Y-axis direction scrolls the WEB page upward. Thus, the displayed part is displayed with moving (step S207). FIG. 14D illustrates an example of the information stored in the first storage unit 123 at that time. It is found that the operation with the touch point 1303 (ID=2) associated with the flag on the possibly invalid touch point that is "FALSE" is recognized.

Similarly to the scroll operation of the browser described in FIG. 13A, the scroll bar is generally displayed near the outer edge of the input region 102 when the scroll bar is displayed on the screen. Such a scroll bar is often implemented. In addition to the scroll bar, an object for the user interface is often displayed near the outer edge of the input region in order not to interrupt the information displayed at the center of the screen. Thus, in a control method in which the touch points near the outer edge of the screen are uniformly determined as invalid inputs, or in a control method in which the touch points near the outer edge that have moved are determined as valid inputs, a touch operation by the user is sometimes not able to accurately be recognized in the case as the example illustrated in FIG. 13C. Further, such methods sometimes cause a restriction on the position to display a user interface. In light of the foregoing, the timing when an operation is started is considered when a process is performed in the present exemplary embodiment. Thus, even a touch-operation near the outer edge of the input region 102 can be recognized without a restriction on the displayed contents.

As described above, in the present exemplary embodiment, the latest obtained touch point in a plurality of touch points obtained by simultaneously touching the input region 102 is determined as a valid input regardless of the position. The latest touch point is included in the predetermined range 103. Thus, from among the touch points determined as possibly invalid inputs, the touch point at the position on which an object associated with the object displayed at the position of the latest touch point is displayed is determined as a valid input. The reason why the determination is made in such a manner is that it is highly possible that the latest touch point is touched because the user intends to start a new touch operation and similarly that it is highly possible that a touch point at the position on which an object associated with the touch point is displayed is touched because the touch point is associated with the operation to be started. As described above, narrowing the touch points determined as possibly invalid inputs using the order in which the touch points have been touched can reduce the load on the process for determining the touch points as invalid or as valid.

(Another Embodiment)

The present invention can be implemented by performing the following process. In other words, software (a program) configured to implement the functions in the above-mentioned exemplary embodiments is provided to a system or an apparatus through a network or various recording media and then the computer (for example, a CPU or an MPU) in the system or in the apparatus reads and executes the program.

(Effect of the Invention)

In light of the above-mentioned problems, the present invention can improve the operability of the user interface displayed in a predetermined range on a touch panel display when a touch point in the predetermined range is selectively determined as an invalid input.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287245, filed Dec. 28, 2012, which is hereby incorporated by reference herein in its entirety.

What is claimed is:

1. An information processing apparatus configured to recognize a touch operation, the information processing apparatus comprising:
    an obtaining unit configured to obtain a plurality of touch positions touched on a display screen;
    a specifying unit configured to, in a case where at least one of the plurality of touch positions obtained by the obtaining unit is included in a predetermined range that is a part of the display screen, specify one or more objects displayed at each of the at least one touch position included in the predetermined range;
    a determination unit configured to determine, with respect to each of the one or more objects specified by the specifying unit, whether the object is associated with any of other objects displayed at each of other touch positions among the plurality of touch positions obtained by the obtaining unit; and
    a decision unit configured to decide, among the plurality of touch positions obtained by the obtaining unit, a touch position included in the predetermined range, for which the determination unit does not determine that the object displayed at the position corresponding to the touch position is associated with any of the other objects displayed on the display screen, as an invalid input for the touch operation, and decide, among the plurality of touch positions obtained by the obtaining unit, a touch position included in the predetermined range, for which the determination unit determines that the object displayed at the position corresponding to the touch position is associated with any of the other objects displayed on the display screen, as a valid input for the touch operation.

2. The information processing apparatus according to claim 1,
    wherein, after performing processing for deciding a touch position included in the predetermined range as a possibly invalid input from among the touch positions obtained by the obtaining unit, the decision unit decides the touch position as an invalid input for the touch operation to the information processing apparatus by eliminating, from the possibly invalid input, the touch position for which the determination unit determines that the object displayed at the position corresponding to the touch position is associated with any of the other objects displayed on the display screen.

3. The information processing apparatus according to claim 1, further comprising:
    a storage unit configured to store information indicating a link between one or more objects displayed on the display screen,
    wherein the determination unit makes a determination based on the information stored in the storage unit.

4. The information processing apparatus according to claim 1,
    wherein the predetermined range, which is a part of the display screen, is a range from an outer edge of the display screen to a predetermined distance away from the outer edge.

5. The information processing apparatus according to claim 1,
    wherein, in a case where deciding, among the plurality of touch positions obtained by the obtaining unit, each of the touch positions included in the predetermined range as a valid input or as an invalid input has reduced the touch positions touched on the display screen to a touch position, the decision unit maintains a decision result to the touch position.

6. The information processing apparatus according to claim 1,
    wherein the decision unit decides, among the plurality of touch positions obtained by the obtaining unit, a touch position that is not included in the predetermined range as a valid input for the touch operation to the information processing apparatus regardless of a result of the determination made by the determination unit.

7. The information processing apparatus according to claim 1,
    wherein, among the obtained plurality of touch positions, a latest touch position becomes a valid input for the touch operation regardless of whether the latest touch position is included in the predetermined range that is a part of the display screen.

8. The information processing apparatus according to claim 1,
    wherein, in a case where one object specified by the specifying unit forms a user interface that operates one function by cooperating with the other object, the determination unit determines that the one object is associated with any of the other objects displayed on the display screen.

9. The information processing apparatus according to claim 8,
    wherein, in a case where the one object specified by the specifying unit is one of a plurality of objects that cooperate to form a user interface that operates one function, the determination unit determines that the one object is associated with any of the other objects displayed on the display screen.

10. The information processing apparatus according to claim 1,
    wherein, in a case where at least one of the plurality of touch positions obtained by the obtaining unit is included in the predetermined range that is a part of the display screen and all of the plurality of touch positions are included in a single object displayed on the display screen, the determination unit determines that the one object specified by the specifying unit is not associated with any of the other objects displayed on the display screen.

11. The information processing apparatus according to claim 1,
wherein, in a case where a touch position among the plurality of touch positions obtained by the obtaining unit is included in the predetermined range, and the determination unit does not determine that the object displayed at the position corresponding to the touch position is associated with any of the other objects displayed on the display screen, the decision unit decides the touch position as a position on the display screen touched by a hand holding the information processing apparatus and invalidates the touch position.

12. A non-transitory computer-readable recording medium configured to store a program that a computer reads and executes such that the computer operates as an information processing apparatus configured to recognize a touch operation, the information processing apparatus comprising:
an obtaining unit configured to obtain a plurality of touch positions touched on a display screen;
a specifying unit configured to, in a case where at least one of the plurality of touch positions obtained by the obtaining unit is included in a predetermined range that is a part of the display screen, specify one or more objects displayed at each of the at least one touch position included in the predetermined range; and
a determination unit configured to determine, with respect to each of the one or more objects specified by the specifying unit, whether the object is associated with any of other objects displayed at each of other touch positions among the plurality of touch positions obtained by the obtaining unit; and
a decision unit configured to decide, among the plurality of touch positions obtained by the obtaining unit, a touch position included in the predetermined range, for which the determination unit does not determine that the object displayed at the position corresponding to the touch position is associated with any of the other objects displayed on the display screen, as an invalid input for the touch operation, and decide, among the plurality of touch positions obtained by the obtaining unit, a touch position included in the predetermined range, for which the determination unit determines that the object displayed at the position corresponding to the touch position is associated with any of the other objects displayed on the display screen, as a valid input for the touch operation.

13. A method for controlling an information processing apparatus configured to recognize a touch operation, the method comprising:
obtaining a plurality of touch positions touched on a display screen;
specifying, in a case where at least one of the plurality of touch positions obtained by the obtaining unit is included in a predetermined range that is a part of the display screen, one or more objects displayed at each of the at least one touch position included in the predetermined range; and
determining, with respect to each of the one or more specified objects, whether the object is associated with any of other objects displayed at each of other touch positions among the plurality of obtained touch positions; and
deciding, among the plurality of obtained touch positions, a touch position included in the predetermined range, for which the determining does not determine that the object displayed at the position corresponding to the touch position is associated with any of the other objects displayed on the display screen, as an invalid input for the touch operation, and deciding, among the plurality of obtained touch positions, a touch position included in the predetermined range, for which the determining determines that the object displayed at the position corresponding to the touch position is associated with any of the other objects displayed on the display screen, as a valid input for the touch operation.

14. The method for controlling an information processing apparatus according to claim 13,
wherein, after performing processing for deciding a touch position included in the predetermined range as a possibly invalid input from among the touch positions obtained by the obtaining, the deciding decides a touch position as an invalid input for the touch operation to the information processing apparatus by eliminating, from the possibly invalid input, the touch position for which the determining determines that the object displayed at the position corresponding to the touch position is associated with any of the other objects displayed on the display screen.

15. The method for controlling an information processing apparatus according to claim 13, further comprising:
storing information indicating a link between one or more objects displayed on the display screen,
wherein the determining is based on the stored information.

16. The method for controlling an information processing apparatus according to claim 13,
wherein the predetermined range, which is a part of the display screen, is a range from an outer edge of the display screen to a predetermined distance away from the outer edge.

17. The method for controlling an information processing apparatus according to claim 13,
wherein, in a case where deciding, among the plurality of obtained touch positions, each of the touch positions included in the predetermined range as a valid input or as an invalid input has reduced the touch positions touched on the display screen to a touch position, the deciding maintains a decision result to the touch position.

18. An information processing apparatus comprising:
an obtaining unit configured to obtain a plurality of pointed positions pointed to by a user on a display screen;
a specifying unit configured to, in a case where at least one of the plurality of pointed positions obtained by the obtaining unit is included in a predetermined range that is a part of the display screen, specify one or more objects displayed at each of the at least one pointed position included in the predetermined range; and
a determination unit configured to determine, with respect to each of the one or more objects specified by the specifying unit, whether the object is associated with any of other objects displayed at each of other pointed positions among the plurality of pointed positions obtained by the obtaining unit; and
a decision unit configured to decide, among the plurality of pointed positions obtained by the obtaining unit, a pointed position included in the predetermined range, for which the determination unit does not determine that the object displayed at the position corresponding to the pointed position is associated with any of the other objects displayed on the display screen, as an invalid input for an operation, and decide, among the plurality of pointed positions obtained by the obtaining unit, a pointed position included in the predetermined range, for which the determination unit determines that the object displayed at the position corresponding to the pointed position is associated with any of the other objects displayed on the display screen, as a valid input for the operation.

19. The information processing apparatus according to claim 18,
wherein the obtaining unit obtains at least one of a touch position touched by the user's finger and a proximate position to which the user's finger is close on the display screen as a pointed position.

* * * * *